UNITED STATES PATENT OFFICE.

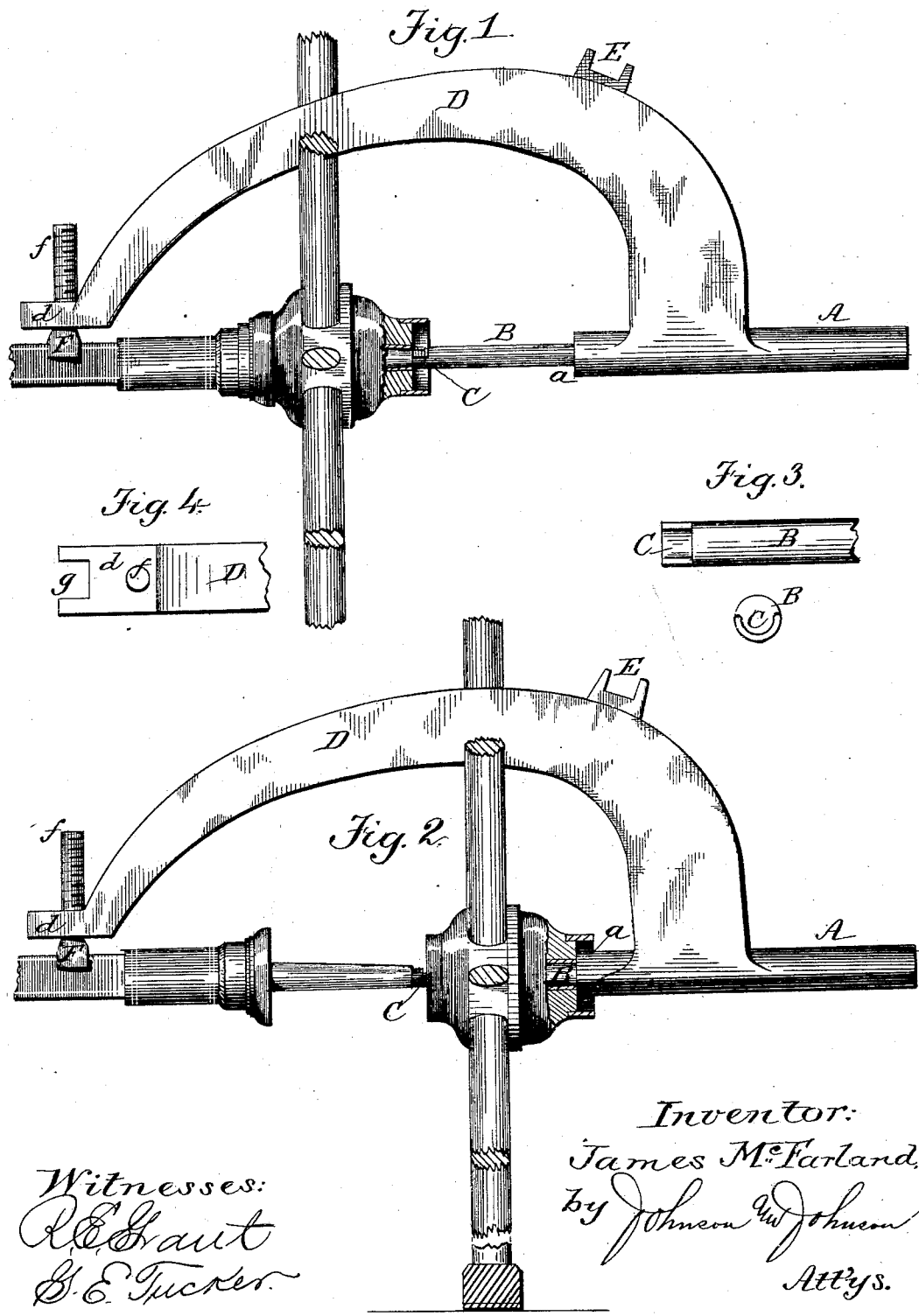

JAMES McFARLAND, OF RICHLAND, IOWA, ASSIGNOR OF ONE-HALF TO THOMAS CATESBY LONG, OF IOLA, KANSAS.

CARRIAGE-JACK.

SPECIFICATION forming part of Letters Patent No. 310,453, dated January 6, 1885.

Application filed October 30, 1884. (No model.)

*To all whom it may concern:*

Be it known that I, JAMES McFARLAND, a citizen of the United States, residing at Richland, in county of Keokuk and State of Iowa, have invented new and useful Improvements in Carriage-Jacks, of which the following is a specification.

The invention relates to the class of lifting-jacks, and more particularly to the sub-class of carriage-jacks; and the objects of my improvements are to lift and hold the axle by an inserted continuation thereof combined with a bowed arm for the purpose of an axle-bearing. The wheel itself then acts as a prop while the axle-arm is being greased. I also contemplate making such axle-bearing adjustable, in case it should be necessary to raise or lower the bearing end of the bow, to fit the supporting inserted continuation in line with the axle. The device also has the provision of a nut-wrench.

In the accompanying drawings and following description I illustrate the particular means for carrying out said objects.

In the said drawings, Figure 1 represents an elevation of a lifting-jack embracing my improvements as applied to the wheel and axle of a carriage, showing by a section of the hub the act of raising the wheel by the inserted axle continuation of the lifting-jack; Fig. 2, another elevation of the same, showing the hub as upon the "continuous axle" and the wheel acting as the supporting-prop; Fig. 3, a detail of the axle continuation, and Fig. 4 a detail of the bearing end of the bow.

The said continuous axle B is of round form, similar to an axle-arm of a carriage, and is properly shouldered at $a$, where it connects with the bowed arm or goose-neck D, which is provided at its other end with an axle-bearing fork, F, to be presently described.

The device proper is provided with a handle, A, for lifting purposes. The continuous axle B has at its inserting end a supporting semi-cylindrical socket open bearing, C, for the reception of the end of the axle-arm after the nut is removed, and is thus made to conform to it. The bearing-fork F has a screw-stem, $f$, passing through an angular projection, $d$, of the goose-neck D, for a purpose which shall hereinafter appear. The goose-neck at a convenient point is also provided with a suitable wrench device, E, to unscrew the screw-nut which secures the hub of the wheel to the axle-arm.

Viewing the drawings, the operation of lifting and supporting the axle and pushing the wheel from off the axle-arm to grease the latter is as follows: The goose-neck being passed between the wheel-spokes, the end F $f$ resting on the axle as a fulcrum, and the hub-nut having been previously removed, the continuous axle B of the lifting-jack is inserted beneath the end of the axle within the hub-band in such manner as that its open supporting semi-cylindrical bearing C shall receive thereupon the end of the axle-arm. The wheel is then lifted and drawn forward upon the part B, which then forms a continuation of the axle, the wheel being let down and acting as a prop. No lifting-levers are used. The bearing F need not necessarily consist of a screw-stem passing through a threaded hole, but may be formed upon and project direct from the goose-neck. The fork-bearing is, however, made adjustable by screw or other means in case it should become necessary to raise or lower in order to align the part B with the axle. It is best that the part B have its end of slightly less diameter than that of the axle-arm, so that it may accommodate itself to the axle-shoulder for the nut. The angular projection $d$ may also be formed with a wrench, $g$ if deemed necessary.

The whole device is made of metal.

The goose-neck is for the purpose of spanning the hub between the spokes, and the arm may be formed on it or screwed into it or otherwise attached.

I claim—

1. The combination, in a lifting-jack, of the bow or goose-neck D, a handle therefor, the continuous axle-bearing part B, and an axle-fulcrum bearing, substantially as and for the purpose set forth.

2. The combination, in a lifting-jack, of the goose-neck D, the handle A, the continuous axle part provided with the supporting open bearing C, and a forked axle-bearing part, F f, substantially as and for the purpose described.

3. The herein-described lifting-jack, consisting of a bowed arm or goose-neck having a handle and an axle and wheel supporting arm at one end and a fulcrum-bearing at the other end, as a new article of manufacture, substantially as herein set forth.

4. As a new article of manufacture, a lifting-jack formed as an entirety of a goose-neck or bow having at one end a handle and a cylindrical arm provided with a socket end adapted to receive and support both the axle and the wheel, and at its other end a fulcrum-bearing and one or more nut-wrenches, substantially as described.

In testimony whereof I have hereunto set my hand in the presence of two subscribing witnesses.

JAMES McFARLAND.

Witnesses:
A. C. CHARLTON,
A. R. BOSWORTH.